(12) United States Patent
Yeremin et al.

(10) Patent No.: US 6,573,500 B2
(45) Date of Patent: Jun. 3, 2003

(54) METHOD OF PRECISION CALIBRATION OF MAGNIFICATION OF A SCANNING MICROSCOPE WITH THE USE OF TEST DIFFRACTION GRATING

(75) Inventors: Dmitriy Yeremin, Dobbs Ferry, NY (US); Arkady Nikitin, Ardsley, NY (US)

(73) Assignee: General Phosphorix LLC, Ardsley, NY (US)

( * ) Notice: Subject to any disclaimer, the term of this patent is extended or adjusted under 35 U.S.C. 154(b) by 0 days.

(21) Appl. No.: 09/924,423

(22) Filed: Aug. 8, 2001

(65) Prior Publication Data

US 2003/0029997 A1 Feb. 13, 2003

(51) Int. Cl.[7] ................................................. H01J 37/26
(52) U.S. Cl. ...................... 250/310; 250/252.1; 250/307
(58) Field of Search ................................ 250/305, 306, 250/307, 308, 310, 311

(56) References Cited

U.S. PATENT DOCUMENTS 4,818,873 A * 4/1989 Herriot .................... 250/252.1
5,659,174 A * 8/1997 Kaneoka et al. ............. 250/307
5,714,832 A * 2/1998 Shirrod et al. .............. 310/328
5,825,670 A * 10/1998 Chernoff et al. ............ 250/307
5,920,067 A * 7/1999 Cresswell et al. .......... 250/306
6,384,408 B1 * 5/2002 Yee et al. ................ 250/252.1

* cited by examiner

*Primary Examiner*—John R. Lee
*Assistant Examiner*—Paul M. Gurzo
(74) *Attorney, Agent, or Firm*—I. Zborovsky

(57) ABSTRACT

A method of precision calibration of magnification of a scanning microscope with the use of a test diffraction grating has the steps of positioning and orienting of a test object on a stage of microscopes so that strips of a test diffraction grating are perpendicular to a direction along which a calibration is performed, scanning a selected portion of the test object along axes X and Y, measuring values of a signal S versus coordinates x and y in a plane of scanning and storing the values S (x,y) in a digital form as a two-dimensional digital array, transforming the two-dimensional array of signals (x, y) into a two-dimensional array S(u, v) by turning of the axes so that a direction of a new axis U is perpendicular to the strips of grating and a direction of a new axis V coincides with the strips of the grating, line-by-line mathematical processing of the array S(u, v) in a new manner.

3 Claims, 3 Drawing Sheets

Image of a test object.
1- field of view; 2- pixels; 3- strips of the test diffraction grating; u- direction in which magnification of a microscope is to be determined Figure 1. Image of a test object.
1- field of view; 2- pixels; 3- strips of the test diffraction grating; u- direction in which magnification of a microscope is to be determined Figure 2. Initial and new coordinate systems.
1- microscope field of view; 2- strips of test diffraction grating Function of modified self-convolution P(w) for a periodical structure.

METHOD OF PRECISION CALIBRATION OF MAGNIFICATION OF A SCANNING MICROSCOPE WITH THE USE OF TEST DIFFRACTION GRATING

BACKGROUND OF THE INVENTION

The present invention relates to a method of precision calibration of magnification of a scanning microscopes with the use of test diffraction grating.

Methods of precision calibration of a magnification of scanning microscopes with the use of test diffraction gratings are known. In the existing methods a test object is positioned and oriented on a microscope stage, and a corresponding part of the test objects is scanned, with subsequent processing of the thusly obtained data. It is believed that the existing methods can be further improved.

SUMMARY OF THE INVENTION

Accordingly, it is an object of the present invention to provide method of precision calibration of magnification of a scanning microscopes with the use of test diffraction grating.

In keeping with these objects and with others which will become apparent hereinafter, one feature of present invention resides, briefly stated, in a method of precision calibration of magnification of a scanning microscope with the use of test diffraction grating, which includes the steps of positioning an orientation of a test object on a stage of microscope so that strips of a test diffraction grating are perpendicular to a directional on which a calibration is performed, scanning of a selected portion of the test object along axes X and Y; measuring values of a signal S versus coordinates X and Y in a plane of scanning and storing said values S(x, y) in a digital form as a two-dimensional digital array; transforming the two-dimensional array of signals S(x, y) into a two dimensional array S(u, v) by turning of the axes so that a direction of a new axis U is perpendicular to the strips of the grating and a direction of a new axis v coincides with the strips of the grating; line-by-line mathematical processing of the array S(u, v) including: separation from it of a one-dimensional array-line S(u) which contains a profile of an image of periodically repeating stripes of a test-object; multiplication of the line S(u) by shifting of Its copy relative to an original by an integral number of periods, clarification of a value of the shift for example by the method of least squares in accordance with a criterion of the best coincidence of the overlapping portions of the original and the copy of the line S(u), calculation of average values S(u) in the zone of overlapping as a semisum of values of the original and copy S(u) in each point of the zone; transformation of the multiplied array S(u) into an array P(w) in accordance with formula $$P(w) = \sum_{j=1}^{N/2} \{[S(j) * S(j+w)]\}$$

where N is a number of centers in the multiplied array S(u), w is an argument, j– is an index of summing determination of coordinates $w_1, w_2, w_3, w_4$ of successive maximums of the function P(w) wherein $w_4 > w_3 > w_2 > w_1 > w_0$; determination of an average period T' of the test grating in pixels for the selected line S(u) in accordance with the formula $$T' = \frac{1}{n} \sum_{l+1}^{a} (w_{i+1} - w_i)$$

where n is a number of a minima in the function P(w); moving to a next line S(u) with a new value of a coordinate V and performing the same steps of the line-by-line mathematical processing for the next line; performing a standard statistic processing of obtained set of values T' corresponding to various lines v with calculation of an average period $T_{ave}$ for all lines and a standard deviation $\Delta T_{ave}$;

and calculating a magnification $M_u$ on an image medium in accordance with a selected direction u in accordance with the formula $$M_u = \frac{T_{ave} * L}{T_o * N},$$

wherein L is width of a medium of the image in direction of calibration, $T_0$ is an independently attested value of a pitch of the test object, N is a total number of pixels on a line along the direction U.

When the method is performed in accordance with the present invention, the calibration of magnification of the scanning microscopes is further improved.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
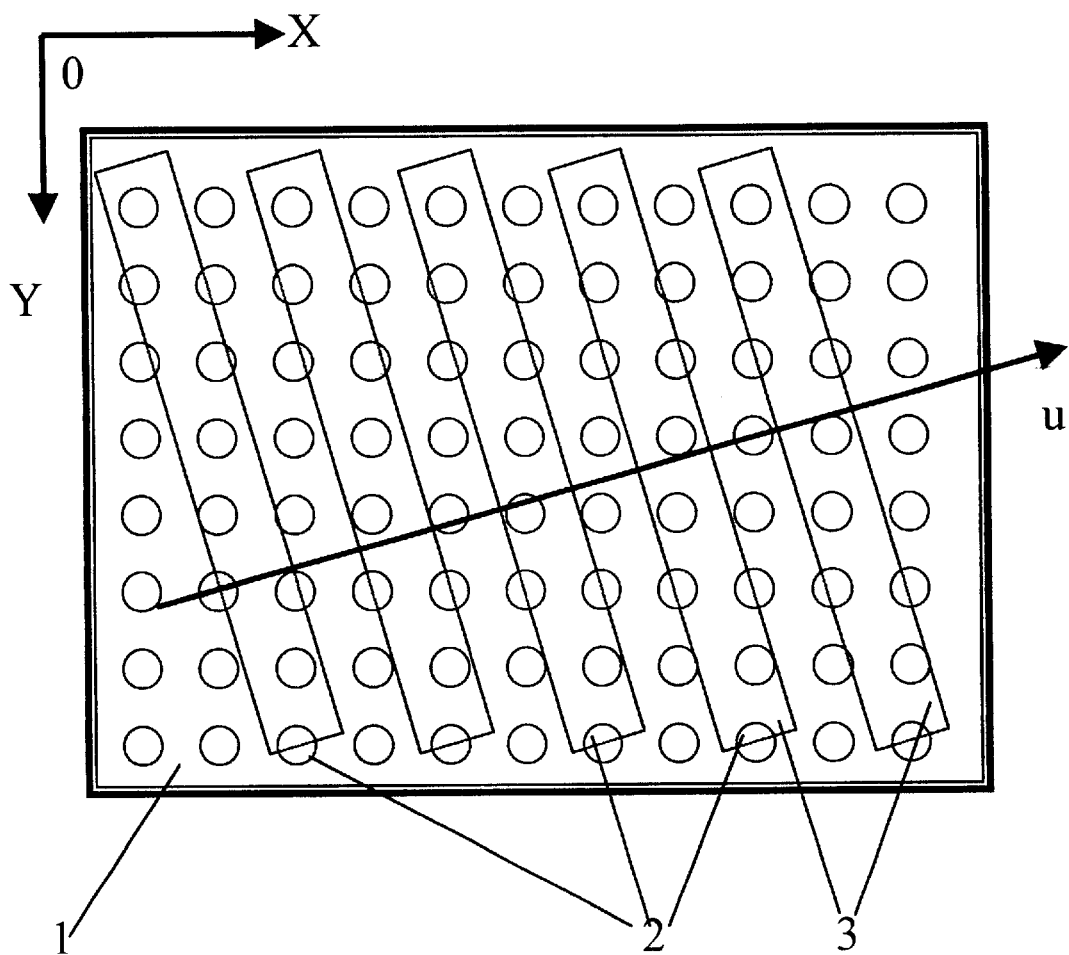
FIG. 1 is a view showing an image of a test object with directions of scanning and a direction in which the magnification of a microscope is to be determined.

In accordance with the present invention a method for precision calibration of a magnification of a scanning microscope is performed with a test diffraction grating. FIG. 1 shows a field of view 1 of a scanning microscope with a plurality of pixels 2 of a signal of scanning with an image of a diffraction grating. The directions of scanning are identified with X and Y and the scanning is performed in accordance with these two perpendicular axes. A magnification calibration of the scanning electron microscope is performed in direction u. As can be seen from this drawing, the test object is positioned and oriented on the microscope stage so that the strips 3 of the test diffraction grate are perpendicular to the direction u of calibration.

Figure 2:
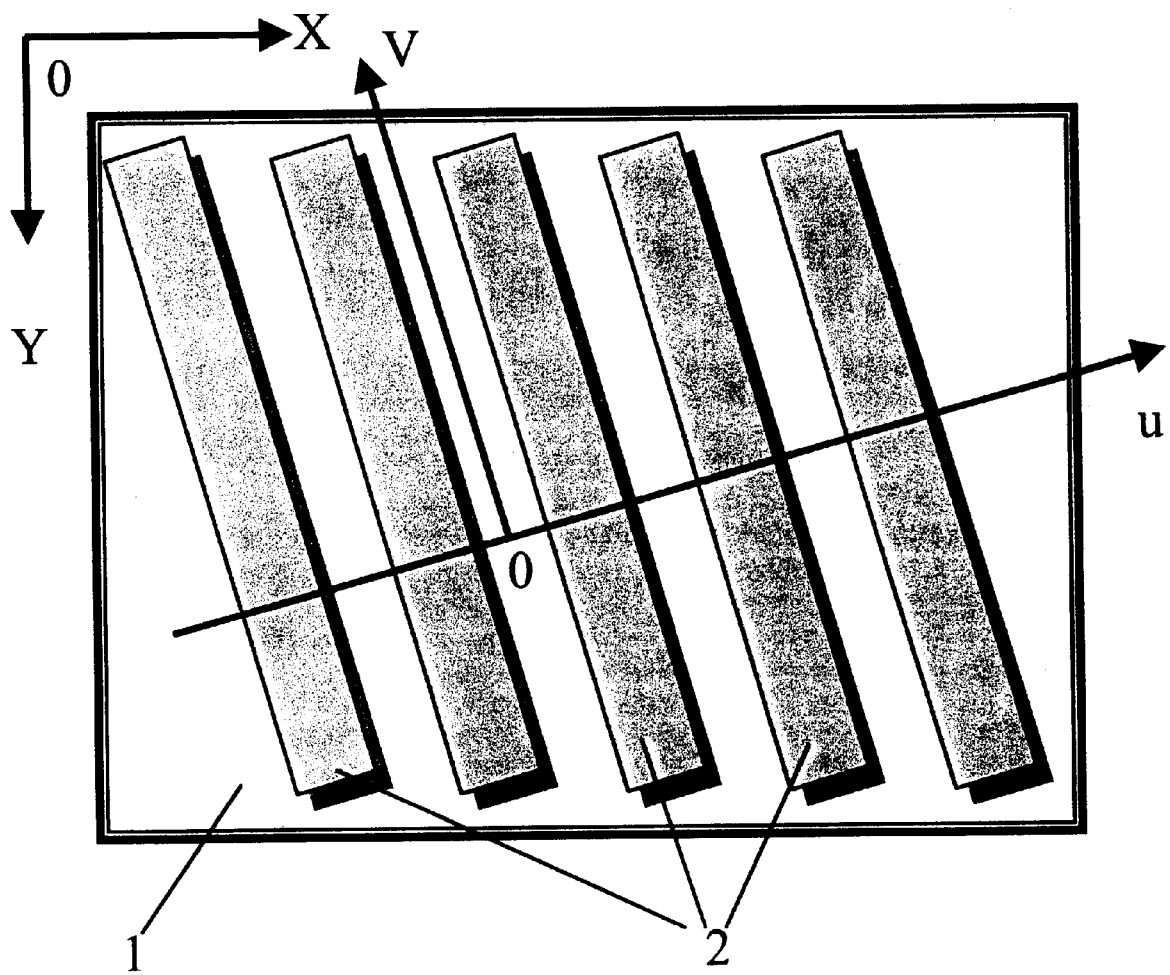
FIG. 2 is a view illustrating an initial coordinate system and a new coordinate system.
Figure 3:
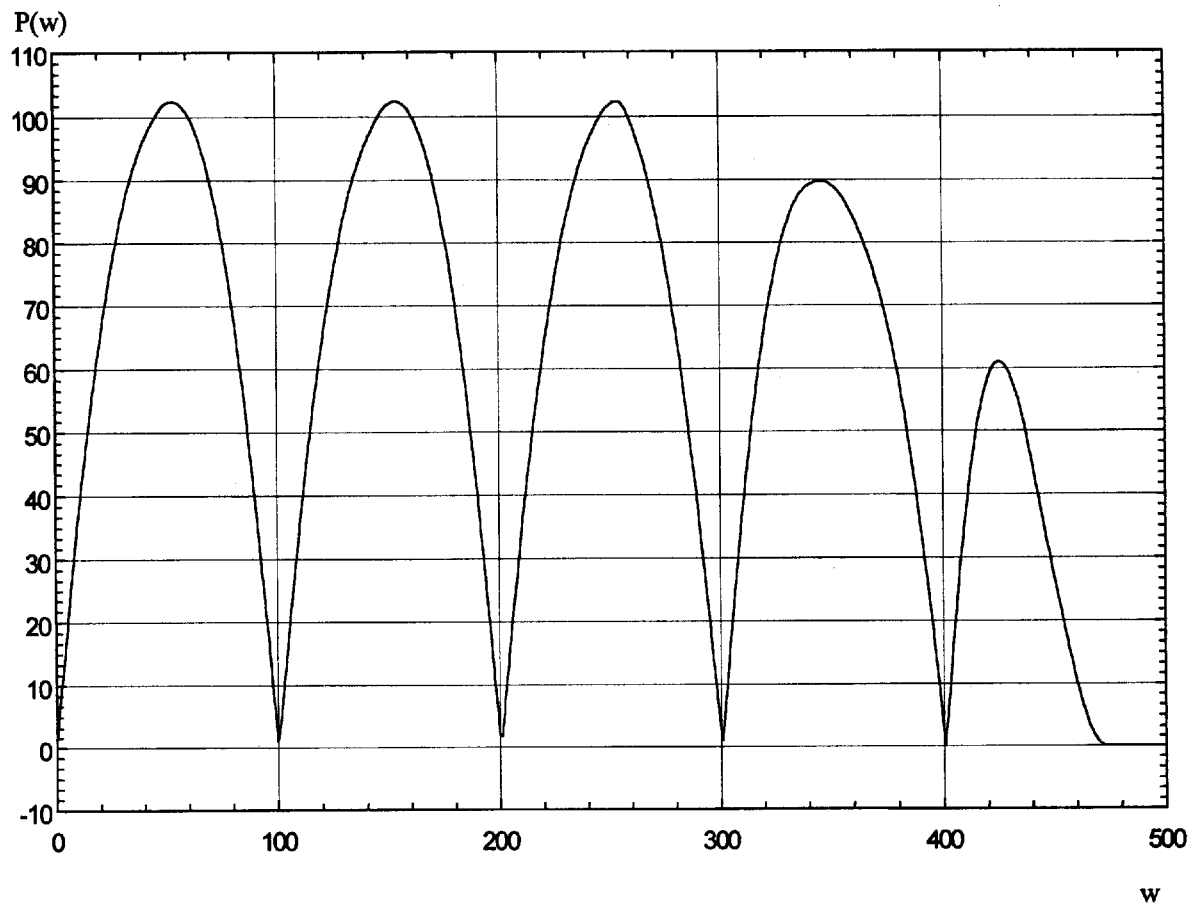
FIG. 3 is a view showing a function of a modified self convolution P(w) for a periodical structure.

A portion of the test object which is shown in FIG. 1 is then scanned, and a plurality of values of the signal S in dependence on the coordinates in a plane of scanning are obtained. These values are identified as S(x, y) and they are stored in a digital form as a two-dimensional digital array, for example in a memory of a computer. The thusly obtained two-dimensional array of signal S(x, y) is transformed into a two-dimensional array S(u, v) by turning of the axes, so that a direction of a new axis U is perpendicular to the strips of the grating, and a direction of a new axis V corresponds to the direction of the strips of the grating, as shown in FIG. 2. Thereby a new array of the signal is obtained.

After this a mathematical processing of new array S(u,v) performed for each line of the new array.

The mathematical processing includes: separation from it of a one-dimensional array-line S(u) which contains a profile of an image of periodically repeating strips of a test-object, transformation of the array S(u) into an array P(w) in accordance with [the] formula $$P(w) = \sum_{j=1}^{N/2} \{[S(j) - S(j+w)]^2\}$$

where N is a number of centers in the multiplied array S(u), w is an argument, j– is an index of summing; determination of coordinates $w_1$, $w_2$, $w_3$, $w_4$ of successive maximums of the function P(w) wherein $w_4 > w_3 > w_2 > w_1 > w_0$, and a determination of an average pitch T' of the test grating in pixels for a selected line S(u) in accordance with the formula:

$$T' = \frac{1}{n}\sum_{i+1}^{u}(w_{i+1} - w_i).$$

where n is a number of minima in the function P(w).

Then the same processing is performed for each line, starting from a next line S(u) with a new value of a coordinate v with the same steps of the line-by-line mathematical processing.

After this, standard statistic processing of the obtained set of values T' is performed, corresponding to the various lines v, with calculation of an average value of the pitch $T_{av1}$, for all lines. A calculation of magnification $M_u$ of an image medium for a selected direction u is performed in accordance with the formula:

$$M_u = \frac{T_{ave} * L}{T_o * N},$$

wherein L is width of a medium of the image in direction of calibration, $T_0$ is a value of pitch of the test object attested by an independent method, and N is a total number of pixels in a line along the direction u.

Before the line-by-line mathematical processing, in accordance with the present invention the operations of noise suppression, averaging and smoothing, etc. are performed.

In accordance with the present invention the calculated function P(w) in the vicinity of each minimum is approximated by a suitable analytical curve, and on the analytical curve an extremum is localized, whose abscissa is accepted as the coordinate $w_i$.

Also, a "cutoff" of each minimum of the function P(w) in accordance with a given level, with formation of an "island" is performed, the postion of a centroid for the "island" formed by the "cutoff" is calculated, and the coordinate $w_i$ is fixed as the abscissa of the centroid.

It will be understood that each of the elements described above, or two or more together, may also find a useful application in other types of constructions differing from the types described above.

While the invention has been illustrated and described as embodied in method of precision calibration of magnification of a scanning microscopes with the use of test diffraction grating, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A method of precision calibration of magnification of a scanning microscope with the use of a test diffraction grating, comprising the steps of positioning and orienting of a test object formed as a test diffraction grating on a stage of microscope so that strips of a test diffraction grating are perpendicular to a direction along which a calibration is performed; scanning a selected portion of the test object along axes X and Y; measuring values of a signal S in dependence on coordinates X and Y in a plane of scanning and storing said values S (x,y) in a digital form as a two-dimensional digital array; transforming the two-dimensional array of signals S(x, y) into a two dimensional array S (u,v) by turning of the axes so that a direction of a new axis U is perpendicular to the strips of grating and a direction of a new axis V coincides with the strips of the grating; line-by-line mathematical processing of the array S(u,v), including separation from it of a one-dimensional array-line S(u) which contains a profile of periodically repeating strips of the test-object; transformation of the array S(u) into an array P(w) in accordance with formula $$P(w) = \sum_{j=1}^{N-w}\{[S(j) - S(j+w)]^2\}$$

where N is a number of members in the array S(u), w is an argument, j is an index of summing, determination of coordinates of $w_1$, $w_2$, $w_3$, $w_4$ of successive maximums of the function P(w) wherein $w_4 > w_3 > w_2 < w_1 > w_0$, and a determination of an average pitch T' of the test grating in pixels for selected line S(u) in accordance with the formula $$T' = \frac{1}{n}\sum_{i+1}^{u}(w_{i+1} - w_i).$$

where n is a number of minima in the function P(w); moving to a next line S(u) with a new value of a coordinate V and performing the same steps of the line-by-line mathematical processing for the next line; performing a standard statistic processing of obtained set of values T' corresponding to various lines v with a calculation of an average for all lines value of the pitch $T_{ave}$ and calculating a magnification $M_u$ on an image medium in selected direction u in accordance with the formula $$M_u = \frac{T_{ave} \cdot L}{T_0 \cdot N},$$

wherein L is a width of the image carrier in direction of calibration, $T_0$ is a value of pitch of the test object attested by an independent method, and N is a total number of pixels in a line along the direction u.

2. A method as defined in claim 1; and further comprising, before the line-by-line mathematical processing, performing at least one operation selected from the group consisting of a noise suppression, an averaging and a smoothing.

3. A method as defined in claim 1; and further comprising the steps in accordance with which a "cutoff" of each maximum of the function P(w) in accordance with a given level, with formation of an area is performed, the position of a centroid for the area formed by the "cutoff" is calculated, and the coordinate $w_i$ is fixed as the abscissa of the centroid.

* * * * *